(12) United States Patent
Assil

(10) Patent No.: US 9,533,466 B2
(45) Date of Patent: Jan. 3, 2017

(54) AUTOMOBILE FLOOR MAT

(75) Inventor: Michael Assil, Los Angeles, CA (US)

(73) Assignee: AUTOMOTIVE FLOORING, LLC, Los Angeles, CA (US)

( * ) Notice: Subject to any disclaimer, the term of this patent is extended or adjusted under 35 U.S.C. 154(b) by 957 days.

(21) Appl. No.: 12/271,759

(22) Filed: Nov. 14, 2008

(65) Prior Publication Data

US 2010/0124630 A1    May 20, 2010

(51) Int. Cl.
| | | |
|---|---|---|
| *B32B 3/04* | (2006.01) |
| *B32B 3/06* | (2006.01) |
| *B32B 3/08* | (2006.01) |
| *B32B 3/10* | (2006.01) |
| *B32B 3/24* | (2006.01) |
| *B32B 5/24* | (2006.01) |
| *B32B 7/08* | (2006.01) |
| *B32B 7/12* | (2006.01) |
| *B32B 15/04* | (2006.01) |
| *B32B 15/14* | (2006.01) |
| *B32B 21/04* | (2006.01) |
| *B32B 21/10* | (2006.01) |
| *B60N 3/04* | (2006.01) |
| *B32B 5/26* | (2006.01) |
| *B32B 15/18* | (2006.01) |
| *B32B 15/20* | (2006.01) |
| *B32B 3/26* | (2006.01) |

(52) U.S. Cl.
CPC . *B32B 3/10* (2013.01); *B32B 5/26* (2013.01);
*B32B 7/08* (2013.01); *B32B 7/12* (2013.01);
*B32B 15/14* (2013.01); *B32B 15/18* (2013.01);
*B32B 15/20* (2013.01); *B32B 21/10* (2013.01);
*B60N 3/04* (2013.01); *B60N 3/042* (2013.01);
*B60N 3/048* (2013.01); *B32B 3/06* (2013.01);
*B32B 3/266* (2013.01); *B32B 2262/106*
(2013.01); *B32B 2471/04* (2013.01); *B32B*
*2605/08* (2013.01); *Y10T 428/24331* (2015.01)

(58) Field of Classification Search
None
See application file for complete search history.

(56) References Cited

U.S. PATENT DOCUMENTS

| 334,994 A | * | 1/1886 | Spadone | ................. E04F 11/17 16/10 |
| 1,595,581 A | * | 8/1926 | Stedman | ................... B44C 1/26 156/248 |

(Continued)

FOREIGN PATENT DOCUMENTS

| DE | 510023 C | * | 10/1930 | ............. B60N 3/046 |
| DE | 8004708 U1 | * | 8/1980 | |

(Continued)

OTHER PUBLICATIONS

Machine Translation of DE 8911331 A, Nov. 1989.*

(Continued)

*Primary Examiner* — Jeff Vonch
(74) *Attorney, Agent, or Firm* — Kleinberg & Lerner, LLP; Marvin H. Kleinberg; Marshall A. Lerner

(57) ABSTRACT

An improved floor mat with inlays made out of wood, aluminum, carbon fiber or other decorative materials for automobiles. The floor mat has strategically placed inlays in order to increase durability, while also complimenting the decorative nature of the mats.

12 Claims, 4 Drawing Sheets

(56) References Cited

U.S. PATENT DOCUMENTS

| | | | | |
|---|---|---|---|---|
| 1,920,057 | A | * | 7/1933 | Bronson ............ B29D 99/0057 428/137 |
| 2,012,929 | A | * | 8/1935 | Knowland ............... D04G 3/02 15/217 |
| 3,100,522 | A | * | 8/1963 | McIntyre ........................ 160/90 |
| 3,703,424 | A | * | 11/1972 | Bowker ................. B60N 3/048 156/224 |
| 4,336,289 | A | * | 6/1982 | Davis ............................. 428/67 |
| 4,361,925 | A | * | 12/1982 | Yamamoto ............ A47L 23/266 15/217 |
| 4,382,986 | A | * | 5/1983 | Reuben ................. B60N 3/048 428/124 |
| 4,804,567 | A | * | 2/1989 | Reuben ................. B60N 3/046 428/100 |
| 5,215,348 | A | * | 6/1993 | Wen-Hwang ............... 296/97.23 |
| 5,575,034 | A | * | 11/1996 | Biernacinski et al. ......... 15/217 |
| 5,919,540 | A | * | 7/1999 | Bailey ............................ 428/67 |
| D424,497 | S | * | 5/2000 | Barton ........................ D12/203 |
| 6,224,962 | B1 | * | 5/2001 | Young, III ......... B62D 25/2072 296/97.23 |
| 6,250,001 | B1 | * | 6/2001 | Gillespie ........................ 40/600 |
| 6,569,026 | B1 | * | 5/2003 | Weis ............................. 473/139 |
| 6,986,547 | B2 | * | 1/2006 | Parrish ................... B29C 41/20 296/193.07 |
| D610,958 | S | * | 3/2010 | Assil ........................ D12/203 |
| 2002/0028313 | A1 | * | 3/2002 | Blum et al. .................... 428/54 |
| 2006/0003141 | A1 | * | 1/2006 | Pacione ............... A47G 27/025 428/95 |
| 2007/0059543 | A1 | * | 3/2007 | Kornfalt ............... B44C 5/0415 428/502 |

FOREIGN PATENT DOCUMENTS

| | | | | |
|---|---|---|---|---|
| DE | 8911331 | A | * 11/1989 | ............... B60N 3/04 |
| DE | 3832605 | A1 | * 3/1990 | ........... A47L 23/266 |
| DE | 9113707 | U1 | * 3/1992 | ............ B60N 3/048 |
| DE | 29712612 | U1 | * 12/1997 | ............ B60N 3/046 |
| DE | 29702044 | U1 | * 6/1998 | ............ B60N 3/048 |
| DE | 19928720 | A1 | * 1/2001 | ............ B60R 13/02 |
| DE | 202006010444 | U1 | * 9/2006 | |
| DE | 102007012872 | A1 | * 12/2007 | ............ B60N 3/048 |
| EP | 247677 | A2 | * 12/1987 | ............ B60N 3/044 |
| EP | 1666303 | A1 | * 6/2006 | ............ B60N 3/048 |
| GB | 722551 | A | * 1/1955 | ............ B60N 3/044 |
| GB | 2171902 | A | * 9/1986 | ............ B60N 3/044 |
| GB | 2373721 | A | * 10/2002 | ........... A47L 23/266 |
| JP | 0290152 | U | * 7/1990 | ............... B60N 3/04 |
| JP | 11028145 | A | * 2/1999 | |
| JP | 2000079050 | A | * 3/2000 | |
| JP | 2004098720 | A | * 4/2004 | |
| WO | WO 9111621 | A1 | * 10/1991 | ............... B60N 3/04 |
| WO | WO 9900051 | A1 | * 1/1999 | ............ A47L 23/26 |
| WO | WO 2004037063 | A1 | * 5/2004 | ........... A47L 23/266 |

OTHER PUBLICATIONS

Machine Translation of DE 510023 C, Oct. 1930.*
Machine Translation of DE 9113707 U1, Mar. 1992.*
Machine Translation of DE 29702044 U1, Jun. 1998.*
Machine Translation of JP 2004098720 A, Apr. 2004.*
Machine Translation of DE 19928720 A1, Dec. 1997.*

* cited by examiner

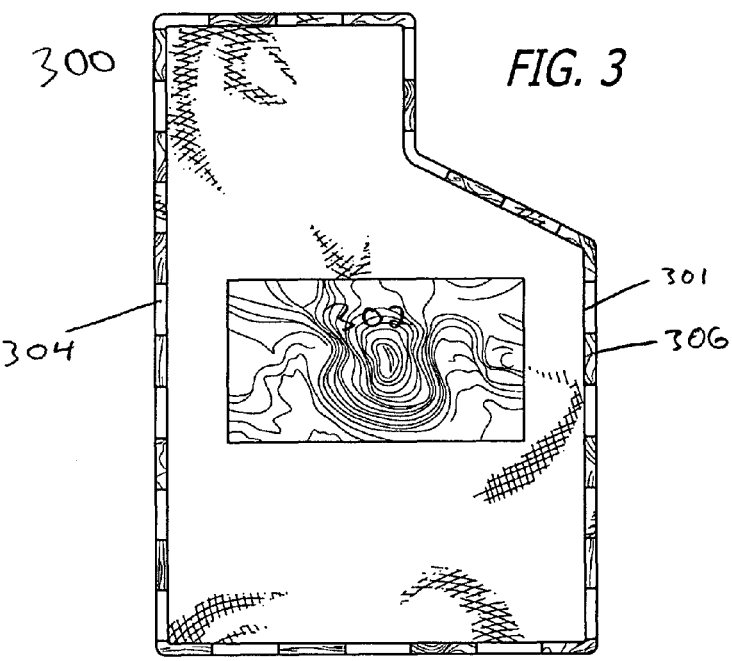
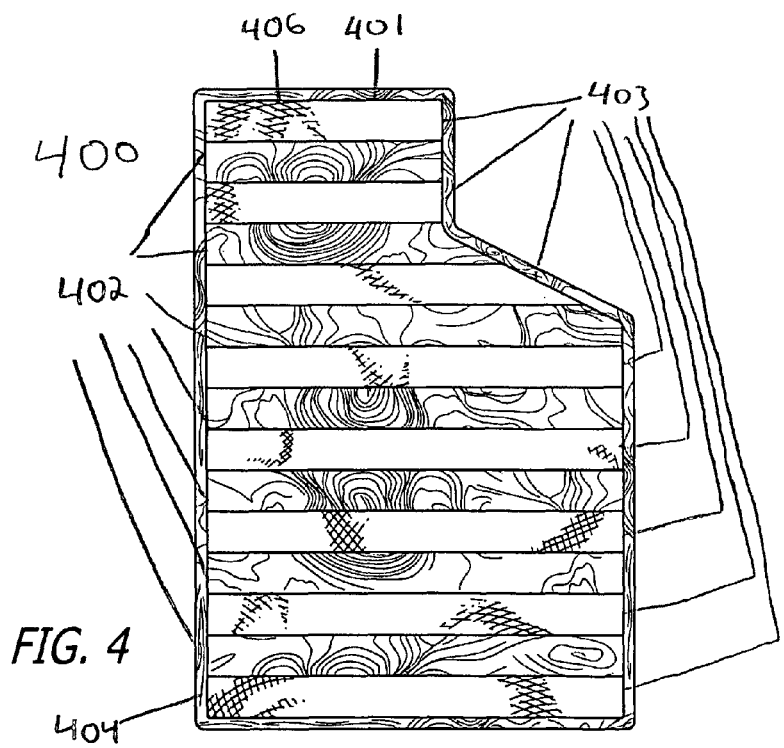

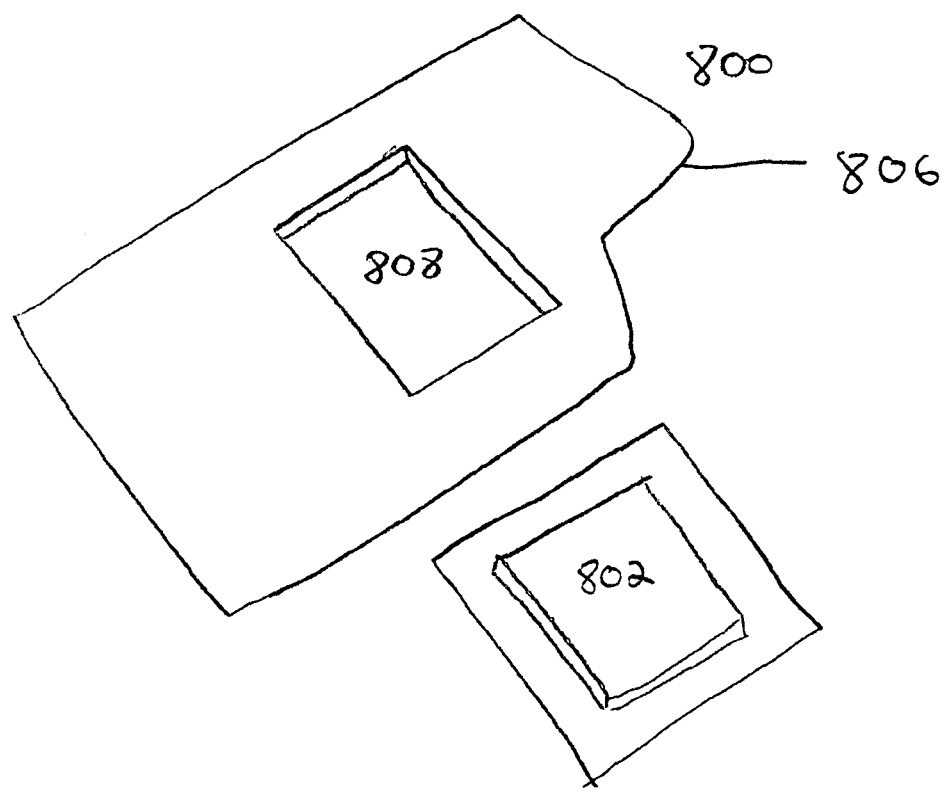

AUTOMOBILE FLOOR MAT

BACKGROUND

1. Field of the Invention

The present invention relates to an improved automobile floor mat. The present invention claims priority from U.S. Provisional Patent Application No. 61/002,560. Standard floor mats are primarily made of carpeting or rubber. Usually, standard factory supplied floor mats are not aesthetically pleasing. Nor do standard, factory supplied floor mats match or coordinate with the various interior trims used in modern vehicles, such as wood, aluminum or carbon fiber to name a few. Furthermore, certain areas of the mats are prone to accelerated wear.

It would be desirable to have an aftermarket automobile floor mat that provides better aesthetics and coordination with different vehicle trims, such as wood, aluminum or carbon fiber to name a few, but also improved wear and longer life.

2. Description of the Related Art

Automobile floor mats, whether factory installed or acquired in the after market, are either single pieces of carpeting or single pieces of rubber or plastic. They are made to increase comfort, and, in the case of after market mats, protect the floor from dirt and wear and for aesthetics.

SUMMARY OF THE INVENTION

In a preferred embodiment of the present invention, a piece of wood, faux wood, aluminum, steel, carbon fiber, or any other rigid or semi-rigid and aesthetically pleasing material is affixed to a floor mat otherwise made of carpet. The material can be affixed to a mat substrate by either screws, adhesive, grommets or a combination of such.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 is a top view of another alternative embodiment of a floor mat;

FIG. 4 is a top view of yet another alternative embodiment of a floor mat;

FIG. 8 is an exploded view of yet another alternative embodiment of a floor mat.

DETAILED DESCRIPTION OF THE INVENTION

Figure 1:
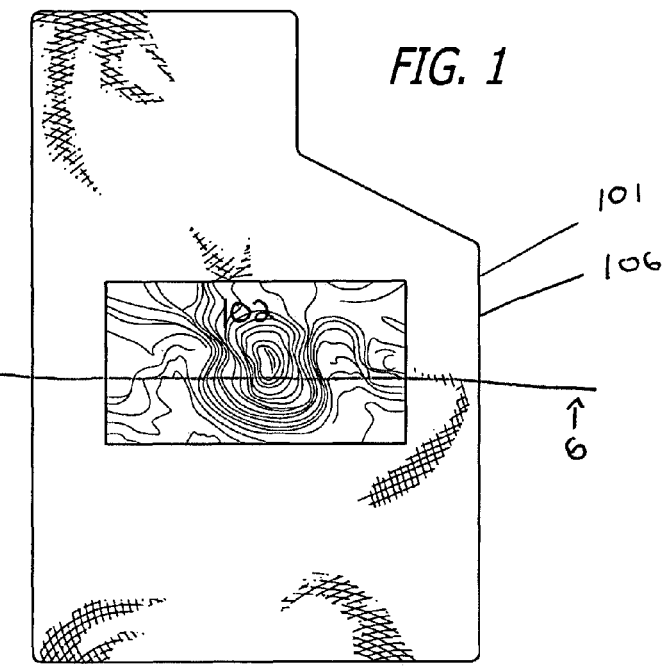
FIG. 1 is a top view of a preferred embodiment of a floor mat of the present invention.

A preferred embodiment of a floor mat 100 is shown in FIG. 1. The floor mat 100 is shaped in a way to not add extra material or bulk to any of the side panels, pillars, drive shaft or any interior panels present and protruding in the seating/floor area in the automobile. This specific embodiment in FIG. 1 is made in a shape so that it does not intrude or interfere with the driver's side pedals or foot placement. It is specifically tailored to the shape of the area in the automobile in which it is to be placed. Most automobiles have carpeting in the floor area and this floor mat is intended to be placed on top of that carpeting. The floor mat 100 can have various shapes and/or tapers depending on the automobile application in which it is used. A matching mat could be supplied for the passenger side, as well. Also matching mats could be supplied for the rear seats. As well, a matching mat could be supplied for the trunk.

This floor mat 100 includes a substrate layer 101 to which is affixed a carpet layer 106. The carpet layer 106 contains a cut away or cut out section 108 in which a single inlay 102 is placed. The substrate 101 has a non slip surface in contact with the factory supplied carpeting (not shown). The inlay 102 is then also fastened to the substrate layer 101.

Figure 2:
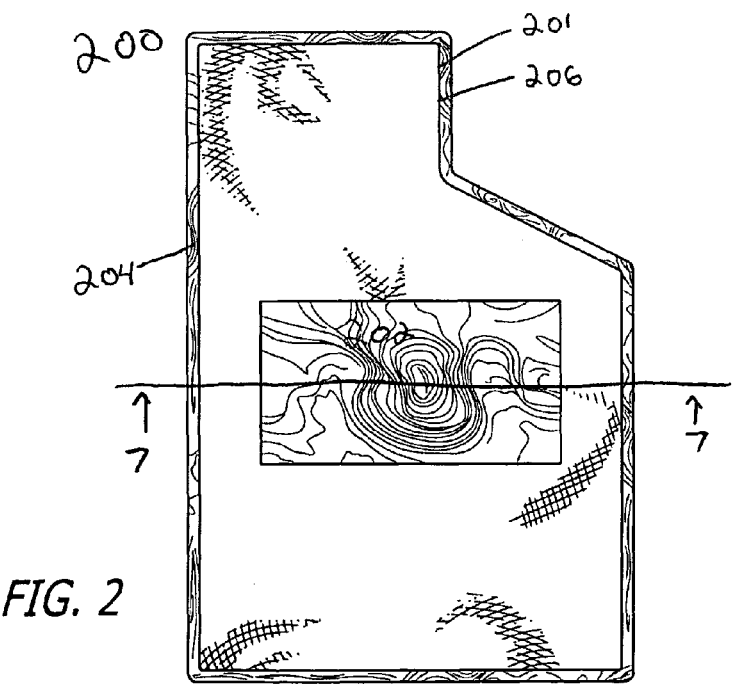
FIG. 2 is a top view of an alternative embodiment of a floor mat.

An alternative embodiment of floor mat 200 is shown in FIG. 2. The floor mat 200 can contain various shapes and/or tapers depending on the automobile application. This floor mat 200 includes a substrate layer 201 to which is affixed a carpet layer 206. The carpet layer of the floor mat 200 contains a cut away section 208 in to which a single inlay 202 is placed. The carpet portion of the floor mat sits flush or reasonably flush with the inlay 202. The floor mat 200 contains an outer border 204 or edging that is comprised of the same or substantially similar material to the single inlay 202. The outer border 204 is comprised of a strip of material that is folded and affixed with an adhesive and/or screws, brats or other fasteners or a deformable brat clip in order to press the border closed.

Alternatively, the outer border 204 can be a single piece of material molded in a "c" shape or a piece of material that is excavated out to form a "c" shape that clips on or is put into place with an adhesive and/or screws, brats, or other fasteners. The outer border 204 is either affixed to the substrate layer 201 to sit flush with the carpet layer or both the substrate layer 201 and the carpet layer 206.

Alternatively, the outer border 204 can be a single piece of material that is affixed in place by an adhesive and/or screws, brats or other fasteners. The outer border 204 is either affixed to the substrate layer 201 to sit flush with the carpet layer or both the substrate layer 201 and the carpet layer 206.

Yet another alternative embodiment of floor mat 200 is shown in FIG. 3. The floor mat 300 can contain various shapes and/or tapers depending on the automobile application in which it is used.

This floor mat 300 also contains a cut away section 308 in the carpet portion in which a single inlay 302 is placed. The floor mat 300 is also comprised of carpet layer 306 and substrate layer 301. The inlay 302 sits flush or reasonably flush with the carpet layer 306.

The floor mat 300 contains an outer border 304 or edging that is comprised of the same or substantially similar material to the single inlay 302. The outer border 304 is comprised of a strip of material that is folded and affixed with an adhesives and/or screws, brats or other fasteners or deformable brat clip in order to press the border closed.

Alternatively, the outer border 304 can be a single piece of material molded in a "c" shape or a single piece of material excavated out to form a "c" shape that clips on or is put into place with an adhesive and/or screws, brats or other fasteners. The outer border 304 is either affixed to the substrate layer 301 to sit flush with the carpet layer or both the substrate layer 301 and the carpet layer 306. The border 304 is comprised of cut strips formed in the manner above or the strip of material as described above is cut to show the perforations so as to form a flexible outline.

Alternatively, the outer border 304 can be a strip of material that is affixed in place by an adhesive and/or screws or other fasteners. The outer border 304 is either affixed to the substrate layer 301 to sit flush with the carpet layer or both the substrate layer 301 and the carpet layer 306. The border 304 is comprised of cut strips formed in the manner above or the strip of material as described above is cut to show the perforations so as to form a flexible outline.

An alternative embodiment of floor mat 200 is shown in FIG. 4. The floor mat 400 can contain various shapes and/or tapers depending on the automobile application in which it is used.

This floor mat 400 contains a plurality of cutaways or cutout sections 403 in which multiple slats of inlay 402 are placed on top of a substrate layer 401. The floor mat 400 is also comprised of carpet layer 406 or some other material that sits flush or reasonably flush with the multiple inlays 402. The carpet layer 406 can be a single piece with a plurality of cut aways or cutout sections, or multiple pieces of carpeting. The floor mat 400 contains an outer border 404 or edging that is comprised of the same or substantially similar material to the multiple inlays 402.

Figure 5:
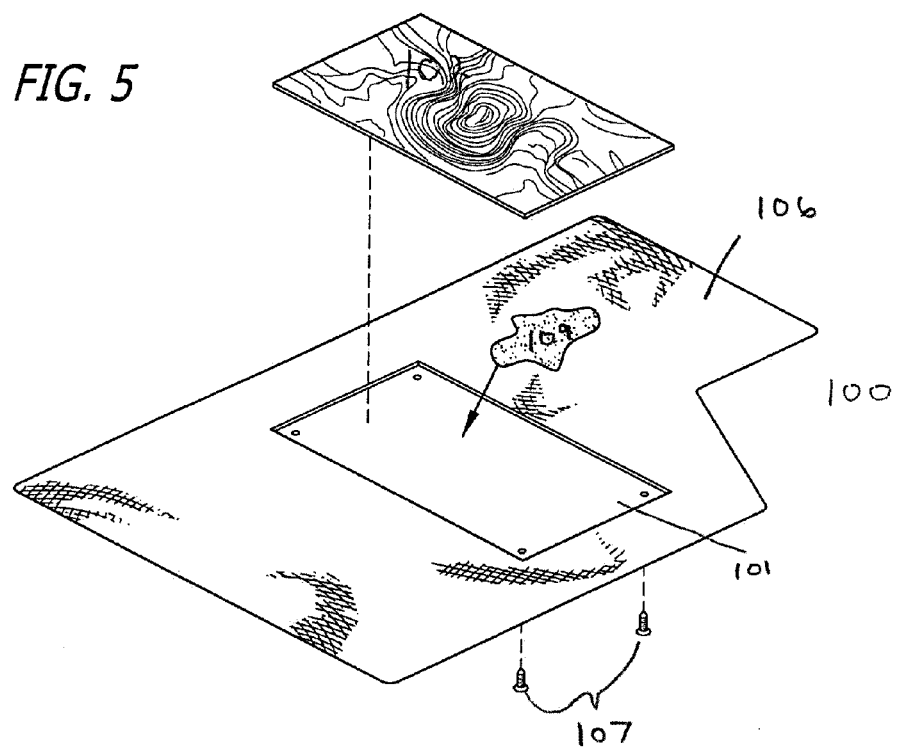
FIG. 5 is an exploded view of the preferred embodiment of FIG. 1.

An exploded view of the preferred embodiment of FIG. 1 of floor mat 100 is shown in FIG. 5. This floor mat 100 contains a cut away or cut out section 108 in which a single inlay 102 is placed. The single inlay 102 is affixed to the substrate layer 101 with either an adhesive 109 or screws 107. The single inlay 102 sits flush with the carpet layer 106.

Figure 6:
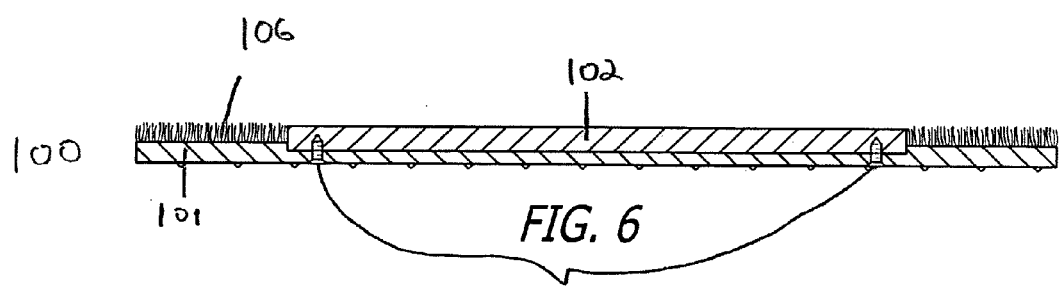
FIG. 6 is a section view of the floor mat of FIG. 1 along line 6-6 in the direction of the appended arrows.

A section view of the embodiment of FIG. 1 is shown in FIG. 6. It shows the floor mat 100 with a cut away or cut out section 108 in which an inlay 102 is affixed to the substrate layer 101 of the floor mat with screws 107. The floor mat 100 contains a carpet layer 106 that sits flush or reasonably flush to the inlay 102.

Figure 7:
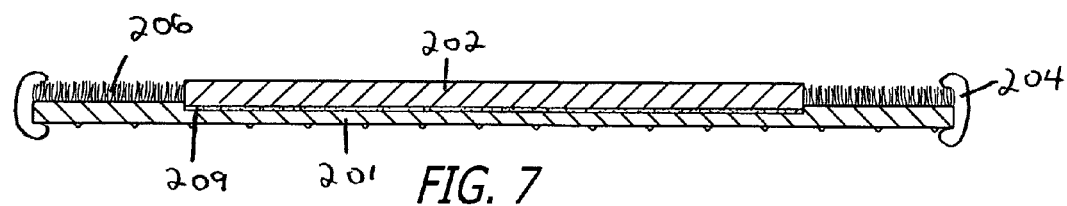
FIG. 7 is a section view of the floor mat of FIG. 2 along line 7-7 in the direction of the appended arrows.

A section view of the embodiment of FIG. 2 is shown in FIG. 7. It shows the floor mat 200 with a cutaway section 208 in the carpet layer 206 in which an inlay 202 is affixed to the substrate layer 201 of the floor mat 200 with an adhesive 209. The floor mat 200 also contains carpeting 206 that sits flush or reasonably flush to the inlay 102. The floor mat 200 also contains a border 204.

An alternative embodiment of floor mat 800 is shown in FIG. 8. The floor mat 800 can contain various shapes and/or tapers depending on the automobile application in which it is used.

This floor mat 800 contains a single carpet layer 806 that has a cutout 808 for an inlay 802. The inlay is comprised of a raised portion that allows it to fit in the cutout yet have a bordering region so that it do stays in place on the mat. The region can be either affixed with adhesive and/or screws, brats or other fasteners or remain in place through friction.

What is claimed is:

1. An automotive floor mat comprising:
   a carpet layer;
   said carpet layer having at least one cutout portion;
   at least one inlay of a material selected from aluminum, steel, wood, faux wood, or carbon fiber, wherein said at least one inlay is placed in said cutout portion;
   a substrate layer supporting said carpet layer and said at least one inlay; and
   a border affixed to the perimeter of the substrate layer, wherein said border comprises the same material or of the same class of material as said at least one inlay.

2. The automotive floor mat of claim 1, wherein said carpet layer is reasonably flush with said at least one inlay.

3. The automotive floor mat of claim 1, wherein said substrate layer comprises a non-slip surface.

4. The automotive floor mat of claim 1, wherein said border is affixed to the substrate layer by an attachment means, wherein said attachment means comprises one or more grommets, screws, brats, an adhesive, or a plurality of fasteners.

5. The automotive floor mat of claim 1, wherein said border comprises a piece of material formed in a "c" shape.

6. The automotive floor mat of claim 1, wherein said border is affixed to said substrate layer and said carpet layer.

7. The automotive floor mat of claim 1, wherein said border is reasonably flush with said carpet layer.

8. An automotive floor mat comprising:
   a carpet layer;
   said carpet layer having at least one cutout portion;
   at least one inlay affixed to a substrate layer, wherein said substrate layer supports said carpet layer and said at least one inlay;
   said inlay is affixed to said substrate layer;
   wherein said at least one inlay comprises aluminum, steel, wood faux wood, or carbon fiber; and
   a border affixed to the perimeter of the substrate layer, wherein said border comprises the same material or of the same class of material as said at least one inlay.

9. The automotive floor mat of claim 8 in which said at least one inlay is affixed to the substrate layer by an attachment means, wherein said attachment means comprising of one or more grommets, screws, brats, adhesive, or plurality of fasteners.

10. The automotive floor mat of claim 8, wherein said border comprises a piece of material formed in a "c" shape.

11. The automotive floor mat of claim 8, wherein said border is affixed to said substrate layer and said carpet layer.

12. The automotive floor mat of claim 8, wherein said border is reasonably flush with said carpet layer.

* * * * *